United States Patent [19]
Cullen et al.

[11] 3,864,270

[45] Feb. 4, 1975

[54] DEHYDROHALOGENATED POLYALKENE-MALEIC ANHYDRIDE REACTION

[75] Inventors: William P. Cullen, Fishkill; Harry Chafetz, Poughkeepsie; Edward F. Miller, Wappingers Fall, all of N.Y.

[73] Assignee: Texaco, Inc., New York, N.Y.

[22] Filed: July 9, 1973

[21] Appl. No.: 377,474

[52] U.S. Cl..................... 252/51.5 A, 260/326.5 F
[51] Int. Cl............................................. C10m 1/36
[58] Field of Search.......... 252/51.5 A; 260/677 XA

[56] References Cited
UNITED STATES PATENTS

| | | | |
|---|---|---|---|
| 2,440,497 | 4/1948 | Winning et al............... | 260/677 XA |
| 3,172,892 | 3/1965 | LeSuer et al................ | 252/51.5 AX |
| 3,219,666 | 11/1965 | Norman et al.............. | 252/51.5 AX |

*Primary Examiner*—W. Cannon
*Attorney, Agent, or Firm*—T. H. Whaley; C. G. Ries

[57] ABSTRACT

The reaction product of a dehydrohalogenated polyalkene and a maleic anhydride prepared by the method comprising halogenating polyalkene, dehydrohalogenating the resultant halogenated polyalkene and reacting the formed dehydrohalogenated polyalkene with maleic anhydride; the derivative of said reaction product and alkylene polyamine having detergent-dispersant properties in oil and hydrocarbon lubricating oil compositions containing said derivative.

4 Claims, No Drawings

DEHYDROHALOGENATED POLYALKENE-MALEIC ANHYDRIDE REACTION

BACKGROUND OF INVENTION

A known effective class of detergent-dispersants for lubricating oils in the prior art are the N-substituted alkenyl succinimides which can be characterized by the formula:

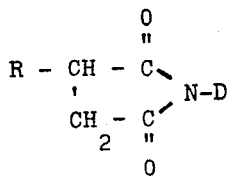

where R is alkenyl (monovalent, monoolefinic hydrocarbon) having a carbon chain length of between about 30 and 300 and D is an amine group consisting of alkylene amino and polyalkylene polyamine radicals. These prior nitrogenous dispersants are prepared by reacting polyalkene or halopolyalkene to form alkenyl substituted succinic anhydride followed by the conversion of the alkenyl succinic anhydride to the above described succinimide via the reaction of the anhydride with alkylene polyamine.

For a given weight, there appears to be a direct relationship between the nitrogen content of the ashless dispersants derived from maleic anhydride derivatives and polyalkylene polyamines in respect to detergent-dispersant activity in lubricating oils, the greater the nitrogen content the more effective the material as a detergent-dispersant. These maleic anhydride alkylene polyamine derivatives, although often characterized in terms of succinimide structures, are in essence a complex mixture of compounds some of which may include succinimides, polycyclic nitrogen containing ring compounds and aliphatic amino substituted polyalkenes. The exact character of the complex nitrogenous dispersant and the amount of effective nitrogen which can be incorporated in the nitrogen dispersant for a given weight is determined by the method of manufacture.

There is a continuing need for lubricant additives having an increased detergent-dispersancy, and therefore, nitrogenous ashless dispersants of increasing nitrogen content are in continual demand.

Accordingly, one object of the invention is to provide an intermediate product and method of manufacture from which nitrogenous detergent-dispersants for lube oils of increased nitrogen content can be produced with resultant increased detergent-dispersancy.

Another object of the invention is to provide nitrogenous dispersants of an increased nitrogen content, i.e., of increased detergent-dispersant effectiveness and lubricating oil compositions thereof.

SUMMARY OF INVENTION

We have discovered and this constitutes our invention a novel reaction product mixture resulting from the reaction of dehydrohalogenated polyalkene and maleic anhydride, said product mixture when further reacted with alkylene polyamine produces nitrogenous dispersants for hydrocarbon lubricating oil of increased effectiveness. Still further, the invention pertains to the method of producing the novel dehalogenated polyalkene maleic anhydride product mixture and to the nitrogenous dispersant derivatives thereof. Hereinbefore and hereinafter the terms "halogen" and "halogenated" are limited within the meaning of this invention to chlorine and bromine.

DETAILED DESCRIPTION OF THE INVENTION

More specifically, the novel dehydrohalogenated polyalkene maleic anhydride reaction products and alkylene polyamino derivatives therefrom are complex mixtures of compounds and are best defined in terms of process.

In detail, the method of producing dehydrogenated polyalkene-maleic anhydride reaction product is described in the following three stage reaction:

Dehydrohalogenated Polyalkene-Maleic Anhydride Reaction Product

First Stage

In the first stage, polyalkene of from 30 to 300 carbons is contacted with a halogen selected from the group consisting of chlorine and bromine at a temperature between about 20° and 150°C. utilizing a mole ratio of polyalkene to halogen of between about 1:0.5 and 1:3. Normally, the reaction is conducted over a period of between about 2 and 8 hours and desirably until the polyalkene is monohalogenated. At the end of the reaction period, the resultant reaction mixture is preferably blown with inert gas such as nitrogen to insure the complete removal of evolved HCl and unreacted chlorine.

In the first stage reaction, examples of the polyalkene polymers suitable herein are polyethylene, polypropylene, polybutylene, polyisobutylene and copolymers of alkenes such as the copolymers of propylene and butylene and of ethylene and propylene. Most preferably, the polyalkenes are derived from alkenes of from 2 to 6 carbons and have a preferred molecular weight ranging between 900 and 2,000. One of the most preferred polyalkenes is polyisobutylene of a molecular weight of about 1250.

Second Stage

In the second stage dehydrohalogenation, the chlorinated polyalkene is heated at a temperature between about 150° and 250°C., preferably with continuous inert gas purging. Normally, the heating is continued for a period of between about 2 and 10 hours and continued desirably until a substantial portion of the polyalkene reacted halogen is evolved, e.g., at least about 70 percent. Dehydrohalogenation is probably accomplished by a molecular or double bond rearrangement affording a more reactive diene intermediate.

Third Stage

In the third and final stage of the method, the dehydrohalogenated polyalkene is contacted with maleic anhydride at a temperature between about 100° and 250°C. utilizing a mole ratio of dehydrohalogenated polyalkene to maleic anhydride of between about 1:0.5 and 1:5. The reaction is conducted normally for a period of between about 4 and 24 hours, preferably employing a continuous inert gas purge to remove volatile by-products.

It is theorized the aforedescribed process produces a complex reaction product containing more reacted maleic anhydride therein than reaction products produced by analogous processes and this in turn results in alkylene polyamine nitrogenous derivatives having a greater active nitrogen content per unit weight, and therefore, a more effective detergent-dispersant in lubricating oil.

Dispersant Derivatives

To convert the dehydrohalogenated polyalkene-maleic anhydride reaction product to effective detergent dispersants in lubricating oils, the reaction product is reacted with an alkylene polyamine of the formula:

where $x$ is an integer of from 1 to 6, where $y$ is an integer of from 2 to 6, and $z$ is an integer from 0 to 4 at a temperature between about 100° and 200°C. utilizing a mole ratio of dehydrohalogenated polyalkene-maleic anhydride reaction product to alkylene polyamine of between about 1:0.5 and 1:5 to form the resultant nitrogenous dispersant mixture. The nitrogenous mixture can be purified by the sequence of extracting the crude nitrogenous mixture with a selective solvent, e.g., lower alkanols (methanol) removing the unstripped, unreacted amine and low molecular weight by-product materials stripping off the volatile solvent and unreacted alkylene polyamine leaving the purified nitrogenous dispersant.

Examples of alkylene polyamines include ethylene diamine, propylene diamine, diethylene triamine, dipropylene triamine, dihexamethylene triamine, triethylene tetraamine, tetraethylene pentaamine, pentaethylene pentaimine, tetraethylene hexamine and nonaethylene decamine.

LUBRICANT COMPOSITIONS

The lubricant compositions of the invention comprise a major amount of hydrocarbon oil of lubricating viscosity and a detergent-dispersant amount of the aforedescribed nitrogenous reaction product mixture and include the finished lubricating formulations as well as the lubricating concentrates thereof. Advantageously, in the finished lubricating oil compositions, the nitrogenous reaction product mixture content ranges between about 0.1 and 10 wt. percent, preferably between about 0.5 and 5 wt. percent. In lubricating oil concentrates from which the finished lubricating oils are formed by dilution with additional base lubricating oil, the nitrogenous mixture additive content of between about 10 and 50 wt. percent is normally present.

The hydrocarbon oil in the finished lubricating oil composition normally constitutes at least 85 wt. percent, preferably between about 90 and 98 wt. percent, and in the lubricating oil concentrates between about 50 and 90 wt. percent.

Examples of the hydrocarbon base oils contemplated herein are the naphthenic base, paraffinic base and mixed base mineral oils, lubricating oils derived from coal products and synthetic oils, e.g., alkylene polymers such as polypropylene, and polyisobutylene of a molecular weight between about 250 and 2,500 desirably lubricating base oils having an SUS viscosity at 100°F. of between about 50 and 2,000, preferably between about 100 and 600, are employed.

In the finished lubricating oil compositions, other lubrication oil additives may be included. These other additives may be any of the suitably standard pour depressants, viscosity index improvers, oxidation and corrosion inhibitors, antifoamants, supplementary detergent-dispersants, etc. Exactly what additional additives are included in the finished oils and the particular amounts thereof will depend on the particular use for the finished oil product.

Specific examples of the additives which may be employed in addition to the nitrogenous reaction product detergent dispersant of the invention are as follows:

A widely used and suitable VI improver are the polymethacrylates having the general formula:

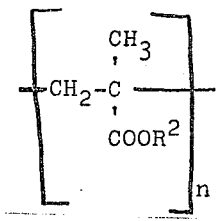

where $R^2$ is an aliphatic hydrocarbon radical of from 1 to 20 carbons and $n$ is an integer of between about 600 and 35,000. One of the most suitable VI improvers is the tetrapolymer of butyl methacrylate, dodecyl methacrylate, octadecyl methacrylate dimethylaminoethyl methacrylate having a respective component ratio in the polymer of about 4:10:5:1. The VI improvers are normally employed in the finished lubricating oil compositions in quantities of between about 0.1 and 3 wt. percent.

One of the commonly employed lube oil corrosion inhibitor and antioxidant additives is the divalent metal dialkyl dithiophosphate resulting from the neutralization of a $P_2S_5$-alcohol reaction product with a divalent metal or divalent metal oxide. Barium and zinc dialkyl dithiophosphate are specific examples. Another class of antioxidants are the polyalkylated diphenylamines such as a mixture of 2,2'-diethyl-4,4'-dioctylphenylamine and 2,2'-diethyl-4-p-octyldiphenylamine. The corrosion and oxidation inhibitors are usually present in the finished lubricating oil compositions in concentrations between about 0.1 and 3 wt. percent.

Examples of supplementary detergent-dispersants which can be employed are the monoethoxylated inorganic phosphorus acid free, steam hydrolyzed polyalkene (500–50,000 m.w.)-$P_2S_5$ reaction products; alkaline earth metal alkylphenolates such as barium nonylphenolate, barium dodecylcresolate, calcium dodecylphenolate and the calcium carbonate overbased calcium alkaryl sulfonates formed by blowing a mixture of calcium hydroxide and calcium alkaryl sulfonate, e.g., calcium alkylbenzene sulfonate of about 900 m.w. with carbon dioxide to form a product having a total base number (TBN) of 50 or more, e.g., 300 to 400.

If antifoamants are employed in the finished compositions, one widely used class which is particularly suitable are the dimethyl silicone polymers employed in amounts of between about 10 and 1,000 ppm.

The following examples will further illustrate the products and their method of preparation of the invention.

EXAMPLE I

This example illustrates the dehydrohalogenated polyalkene-maleic anhydride complex reaction mixture, the method of preparation and the effectiveness of the method in imparting a greater amount of chemically effective maleic anhydride in the reaction mixture as measured by higher saponification numbers than comparative procedures.

First Stage

To a 12 liter 3-necked flask fitted with a condenser, stirrer, thermometer and gas inlet and exit tubes there was charged 6,250 grams (5 mole) of polyisobutylene of a molecular weight of about 1,250. The charge was heated to a temperature of about 121°C. and chlorine gas was bubbled through the stirred polyisobutylene until a net weight gain of 180 grams was obtained. During the chlorine addition, hydrogen chloride was continuously evolved. At the end of the reaction period, the reaction mixture was purged with nitrogen for 0.5 hour to complete removal of the evolved hydrogen chloride and unreacted chlorine. The resultant product weighed 6,430 grams and was analyzed to be essentially monochlorinated polyisobutylene having a chlorine content of 2.8 wt. percent.

Second Stage

The monochlorinated polyisobutylene prepared in the first stage was charged in an amount of 1,270 grams (1 mole) to a 3 liter 3-necked flask fitted as described in the first stage. The charge material was heated at 235°C. for a 5 hour period with continuous nitrogen purging to remove the evolving hydrogen chloride. The final product weighed 1,230 grams indicating a weight loss of 40 grams. Analysis of the product found it to be the dehydrochlorinated polyisobutylene having a residual chlorine content of about 0.5 wt. percent indicating over 80 percent of the chlorinated polyisobutylene was dehydrochlorinated.

Third Stage

The dehydrochlorinated polyisobutylene recovered from the second stage in an amount of 156 grams (0.1 mole) and 19.6 grams of maleic anhydride (0.2 mole) were charged to a 0.5 liter 3-necked flask fitted with thermowell and thermocouple, air condenser and gas inlet tube for nitrogen purge. The mixture was heated at 100°C. for a 6 hour period with stirring, utilizing a continuous nitrogen purge. At the end of the 6 hour period the reaction mixture was stripped of excess maleic anhydride (100°C., 0.1 mm Hg) dissolved in 200 mls. of heptane, chilled in ice bath overnight, filtered and stripped of heptane at 100°C., 40 mm Hg.

The foregoing three stage run is designated as Run A and together with similar Runs C, E and G are reported in following Table I, these runs being representative of the inventive procedure differing only in reaction time, temperatures and mole ratios from one another.

As representative of comparative runs, polyisobutylene (~1,250 m.w.) in an amount of 127 grams (0.1 mole) and maleic anhydride in an amount of 19.6 grams (0.2 mole) were charged to a 3-necked flask as described above in respect to Run A and were heated at 100°C. for a period of 6 hours in a stirred flask with a nitrogen purge. The product was identified as a reaction mixture containing polyisobutylene (~1250 m.w.) succinic anhydride and having a saponification number of 0.8. In addition to this comparative run, additional comparative Runs D, F and H all reported in following Table I were carried out using different reaction times, temperatures and mole ratios. As can be seen from comparison of the saponification numbers as between the representative runs of the invention and the comparative runs, in subsequent Table I the representative run of the invention produces a product of substantially higher active maleic anhydride component under a given set of conditions.

Table I is as follows:

TABLE I

REACTION OF MALEIC ANHYDRIDE (MA) WITH DEHYDROCHLORINATED POLYISOBUTYLENE (DP) AND POLYISOBUTYLENE (P)

| Run No. | Reactants | Molar Ratio DP or P/MA | Temp. (°C.) | Time (Hr.) | Sap. No. |
|---------|-----------|------------------------|-------------|------------|----------|
| A | DP+MA | 1/2 | 100 | 6 | 3.4 |
| B | P+MA | 1/2 | 100 | 6 | 0.8 |
| C | DP+MA | 1/2 | 150 | 6 | 13.5 |
| D | P+MA | 1/2 | 150 | 6 | 1.6 |
| E | DP+MA | 1/2 | 200 | 6 | 30.9 |
| F | P+MA | 1/2 | 200 | 6 | 16.7 |
| G | DP+MA | 1/1 | 200 | 18 | 58.5 (Avg.) |
| H | P+MA | 1/1 | 200 | 18 | 37.1 |

EXAMPLE II

This example illustrates the preparation of the nitrogenous detergent dispersant derivative of the dehydrohalogenated polyalkene-maleic anhydride reaction product and alkylene polyamine. The dehydrohalogenated polyisobutylenemaleic anhydride reaction product of Run E, Table I, Example I, (362 grams, .1 mole) and tetraethylene pentamine (18.9 grams, 0.1 mole) were reacted under nitrogen purge at 120°C. for 4 hours with stirring. The mixture was cooled, dissolved in heptane (400 mls.) and extracted with methanol (300 mls. × 1). The heptane solution was stripped under reduced pressure. The amine derivative, stripped product weighed 350 grams and had a nitrogen content of 1.3 wt. percent.

EXAMPLE III

This example illustrates the lubricant compositions contemplated herein containing the detergent dispersant derivative of the dehydrohalogenated polyalkene-maleic anhydride reaction product and alkylene polyamine. Identical multigrade lubricating oil blends except for the dispersant were run in the Bench Sludge Test (BST) and Bench Varnish Test (BVT) to measure their dispersant activity. BST measures the ability of the oil to disperse sediment in crankcase motor oil. Sediment depth less than 1.0 mm. indicates excellent dispersion. BVT measures the ability of the oil to disperse varnish. Test results are given as percent turbidity. Turbidity less than 10 percent generally indicates good dispersancy. The multigrade lubricating oil formulation tested contained 0.23 wt. percent Ca from overbased clacium alkaryl sulfonate, 0.15 wt. percent zinc from a zinc dialkyldithiophosphate, 10 wt. percent ethylene-propylene copolymer (VI improver) and substituted diarylamine (anti-oxidant) plus 5 wt. percent of dispersant material of the representative Run A Ex.

| Tetraethylenepentamine Derivative of Run A Type | | Tetraethylenepentamine Derivative of Comparative of Run B Type | |
|---|---|---|---|
| BST mm. Sediment | BVT % Turbidity | BST mm. Sediment | BVT % Turbidity |
| 0.5–1.0 | 3.0–5.0 | 1.4–1.8 | 15–30 |

We claim:

1. A lubricating oil composition containing at least about 50 wt. percent hydrocarbon lubricating oil and between about 0.1 and 50 wt. % of a nitrogenous dispersant derivative of a dehydrohalogenated polyalkene-maleic anhydride reaction product prepared by contacting polyalkene of from 30 to 300 carbons with a halogen selected from the group consisting of chlorine or bromine at a temperature of between about 20° and 150°C. utilizing a mole ratio of polyalkene to halogen of between about 1:0.5 and 1:3 to form a halogenated polyalkene, heating said halogenated polyalkene at a temperature of between about 150° and 250°C. and recovering dehydrohalogenated polyalkene from the reaction mixture, contacting said dehydrohalogenated polyalkene with maleic anhydride at a temperature of between about 100° and 250°C. utilizing a mole ratio of dehydrohalogenated polyalkene to maleic anhydride of between about 1:0.5 and 1:5 to form the dehydrohalogenated polyalkene-maleic anhydride reaction product, contacting said dehydrohalogenated polyalkene-maleic anhydride reaction product with an alkylene polyamine of the formula:

$$H_2N(-CH_2-)_x[HN(CH_2-)_yNH-]_z(-CH_2-)_xNH_2$$

where $x$ is an integer of from 1 to 6, $y$ is an integer of from 2 to 6, and $z$ is an integer of from 0 to 4 at a temperature of between about 100° and 200°C. utilizing a mole ratio of dehydrohalogenated polyalkene-maleic anhydride reaction product to alkylene polyamine of between about 1:0.5 and 1:5.

2. The composition in accordance with claim 1 wherein said polyalkylene is polyisobutylene, said halogen is chlorine, and said alkylene polyamine is ethylene diamine.

3. The composition in accordance with claim 1 wherein said polyalkylene is polyisobutylene, said halogen is chlorine, and said alkylene polyamine is tetraethylenepentamine.

4. A composition in accordance with claim 1 wherein said nitrogenous detergent derivative is present in said composition in an amount of between 0.1 and 10 wt. percent.

* * * * *